United States Patent
Sargent (10) Patent No.: US 9,045,918 B2
(45) Date of Patent: Jun. 2, 2015

(54) LOCKING EQUIPMENT RACK

(76) Inventor: David D. Sargent, Riviera Beach, FL (US)

(*) Notice: Subject to any disclaimer, the term of this patent is extended or adjusted under 35 U.S.C. 154(b) by 308 days.

(21) Appl. No.: 13/403,414

(22) Filed: Feb. 23, 2012

(65) Prior Publication Data

US 2013/0220949 A1 Aug. 29, 2013

(51) Int. Cl.
*E05B 73/00* (2006.01)
*A47F 7/00* (2006.01)
*A47F 5/00* (2006.01)
*F16M 11/00* (2006.01)
*F16M 13/00* (2006.01)
*A01G 1/12* (2006.01)

(52) U.S. Cl.
CPC .............. *E05B 73/00* (2013.01); *A01G 1/125* (2013.01)

(58) Field of Classification Search
CPC ...... A01G 1/125; E01H 1/0809; B60R 11/00; B60R 9/00; B60P 7/08; F16M 11/28
USPC .......... 211/8, 4, 13.1, 70.6; 248/125.2, 125.3, 248/125.8, 219.2–219.4, 316.1, 295.11, 248/297.21
See application file for complete search history.

(56) References Cited

U.S. PATENT DOCUMENTS

| | | | | |
|---|---|---|---|---|
| 504,683 | A * | 9/1893 | Peartree | 108/146 |
| 2,016,132 | A * | 10/1935 | Bergslien | 248/409 |
| 3,625,563 | A * | 12/1971 | Dickinson et al. | 297/333 |
| 3,664,164 | A * | 5/1972 | Zaidener | 70/202 |
| 3,854,428 | A * | 12/1974 | Fullenkamp | 108/146 |
| 3,861,695 | A * | 1/1975 | Shourek et al. | 280/5.24 |
| 4,946,186 | A * | 8/1990 | Cheng | 280/646 |
| 4,967,942 | A * | 11/1990 | McGruder | 224/510 |
| 5,169,114 | A * | 12/1992 | O'Neill | 248/551 |
| 5,451,072 | A * | 9/1995 | Weng | 280/646 |
| 5,853,223 | A * | 12/1998 | Ritt et al. | 297/411.36 |
| 5,873,275 | A * | 2/1999 | Lukich | 70/226 |
| 5,879,014 | A * | 3/1999 | Price | 280/47.18 |
| 6,138,483 | A * | 10/2000 | Galant | 70/58 |
| 6,185,917 | B1 * | 2/2001 | Goudes | 56/12.8 |
| 6,302,280 | B1 * | 10/2001 | Bermes | 211/70.6 |
| 6,311,853 | B1 * | 11/2001 | Johnson | 211/70.6 |
| 6,371,309 | B1 * | 4/2002 | Smith | 211/22 |
| 6,409,029 | B1 * | 6/2002 | Bermes | 211/70.6 |
| 6,484,544 | B1 * | 11/2002 | Wing | 70/227 |
| 6,536,610 | B1 * | 3/2003 | Taylor | 211/70.6 |
| 6,648,152 | B2 * | 11/2003 | Bermes | 211/70.6 |
| 6,966,540 | B2 * | 11/2005 | Falk | 254/2 B |
| 7,044,347 | B1 * | 5/2006 | Pedrini | 224/501 |
| 7,594,415 | B1 * | 9/2009 | Wu | 70/18 |
| 7,703,778 | B2 * | 4/2010 | Refsum | 280/47.4 |
| 7,849,557 | B1 * | 12/2010 | Bellis, Jr. | 15/327.5 |
| 7,997,595 | B1 * | 8/2011 | Pope | 280/47.26 |
| 8,021,278 | B2 * | 9/2011 | Huyck et al. | 482/57 |
| 8,141,836 | B2 * | 3/2012 | Saez et al. | 248/317 |
| 8,220,764 | B2 * | 7/2012 | Ziaylek | 248/312 |
| 8,245,859 | B2 * | 8/2012 | Sargent | 211/85.7 |
| 8,272,999 | B2 * | 9/2012 | Huyck et al. | 482/57 |
| 8,365,969 | B2 * | 2/2013 | Johnson | 224/413 |
| 8,480,170 | B2 * | 7/2013 | Lu et al. | 297/215.13 |
| 8,640,888 | B2 * | 2/2014 | Liu | 211/17 |

(Continued)

*Primary Examiner* — Daniel J Troy
*Assistant Examiner* — Kimberley S Wright
(74) *Attorney, Agent, or Firm* — Sheppard, Mullin, Richter & Hampton LLP (57) ABSTRACT

A locking equipment rack for a backpack blower is presented. The locking equipment rack is adjustable to store a variety of blower models. The equipment rack securely stores the blowers, preventing vibrational damage and theft.

20 Claims, 12 Drawing Sheets

(56) References Cited

U.S. PATENT DOCUMENTS

| | | | |
|---|---|---|---|
| 2003/0160408 A1* | 8/2003 | Liao | 280/47.24 |
| 2005/0132531 A1* | 6/2005 | Haberlein | 15/405 |
| 2005/0205750 A1* | 9/2005 | Hafendorfer | 248/637 |
| 2006/0219849 A1* | 10/2006 | Chiu | 248/125.8 |
| 2007/0215781 A1* | 9/2007 | Watt et al. | 248/622 |
| 2007/0235600 A1* | 10/2007 | Herold et al. | 248/97 |
| 2008/0078727 A1* | 4/2008 | Sargent | 211/4 |
| 2010/0170924 A1* | 7/2010 | Johnson | 224/413 |
| 2010/0276380 A1* | 11/2010 | Sargent | 211/4 |
| 2011/0147547 A1* | 6/2011 | Fitzpatrick et al. | 248/157 |
| 2011/0240572 A1* | 10/2011 | Kerman | 211/20 |
| 2012/0043290 A1* | 2/2012 | Keyvanloo | 211/183 |

* cited by examiner

LOCKING EQUIPMENT RACK

BACKGROUND

1. Technical Field of the Invention

The present invention relates generally to equipment racks, and more particularly, some embodiments relate to locking equipment racks for backpack blowers.

2. Description of the Related Art

Equipment racks such as blower racks are used to help transport and store landscaping equipment. Blower racks are generally mounted on an open trailer or on the wall of an enclosed trailer and used to store backpack blowers and to transport the blowers from one job site to another during the day. Other types of equipment such as, for example, a trimmer, can also be stored on equipment racks. However, trimmers many times require a more specialized rack.

Equipment racks available currently have a number of problems. For example, the racks vibrate when the trailer is being driven down the road because the blowers do not fit tightly into the rack. Additionally, equipment stored in the racks is very susceptible to theft. While most racks include the ability to lock the blowers to the rack, the locks and/or locking system are usually easily circumvented using bolt cutters or a hack saw. The locks used with blower racks are generally completely exposed and can be cut off in seconds using bolt cutters and the blower can subsequently easily be removed. In general, while the blower racks may be a deterrent to some thieves, anyone who is familiar with blower racks and brings the proper equipment can fairly easily steal equipment from existing racks.

BRIEF SUMMARY OF THE DRAWINGS

According to various embodiments, equipment racks are provided that lock and store equipment in a tamper and vibration resistant manner. In some embodiments, the equipment racks are adjustable to fit a variety of models of a particular type of equipment, such as backpack blowers. When secured, the equipment is protected against vibrational damage and theft. Additional embodiments are capable of being placed in a stowed configuration, reducing the space occupied by an unused rack.

According to an embodiment, an equipment rack comprises an outer support shaft; an inner support shaft configured to slide within the outer support shaft; a locking shaft slidably disposed within the inner support shaft to move from an unlocked position to a locked position; a first securing member coupled to the locking shaft; and a second securing member disposed within the outer support shaft, the second securing member configured to fix the position of the inner support shaft with respect to the outer support shaft by mating with the first securing member when the locking shaft is in the locked position.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The various embodiments are described in detail with reference to the following figures. The drawings are provided for purposes of illustration only and merely depict typical or example embodiments. These drawings are provided to facilitate the reader's understanding of the invention and shaft not be considered limiting of the breadth, scope, or applicability of the invention. It should be noted that for clarity and ease of illustration these drawings are not necessarily made to scale.

Some of the figures included herein illustrate various embodiments from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the embodiments and invention can be practiced with modification and alteration, and that the invention be limited only by the claims and the equivalents thereof.

DETAILED DESCRIPTION OF THE DRAWINGS

Figure 1:
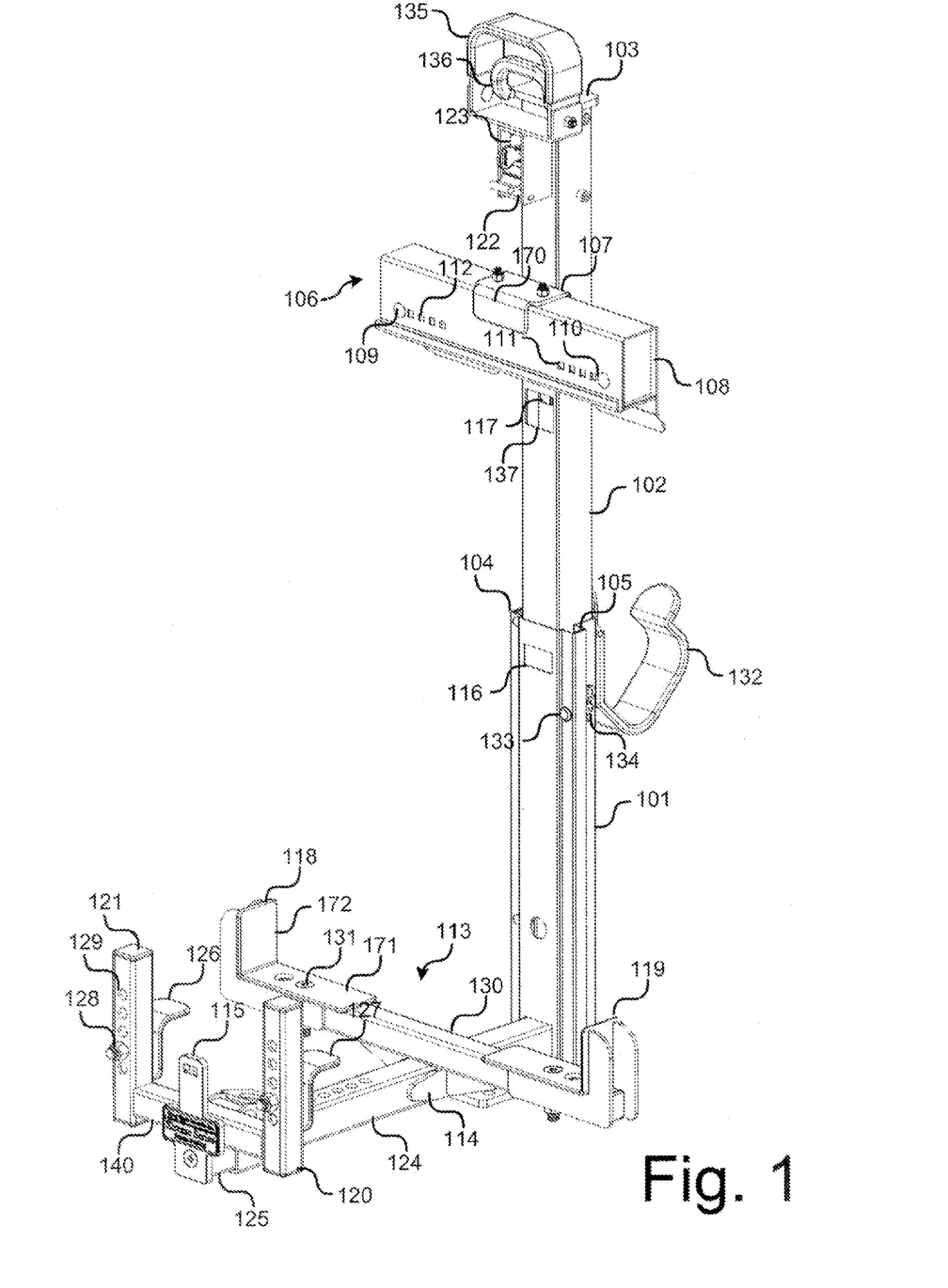
FIG. 1 illustrates a locking equipment rack in an extended position and implemented in accordance with an embodiment.
Figure 2:
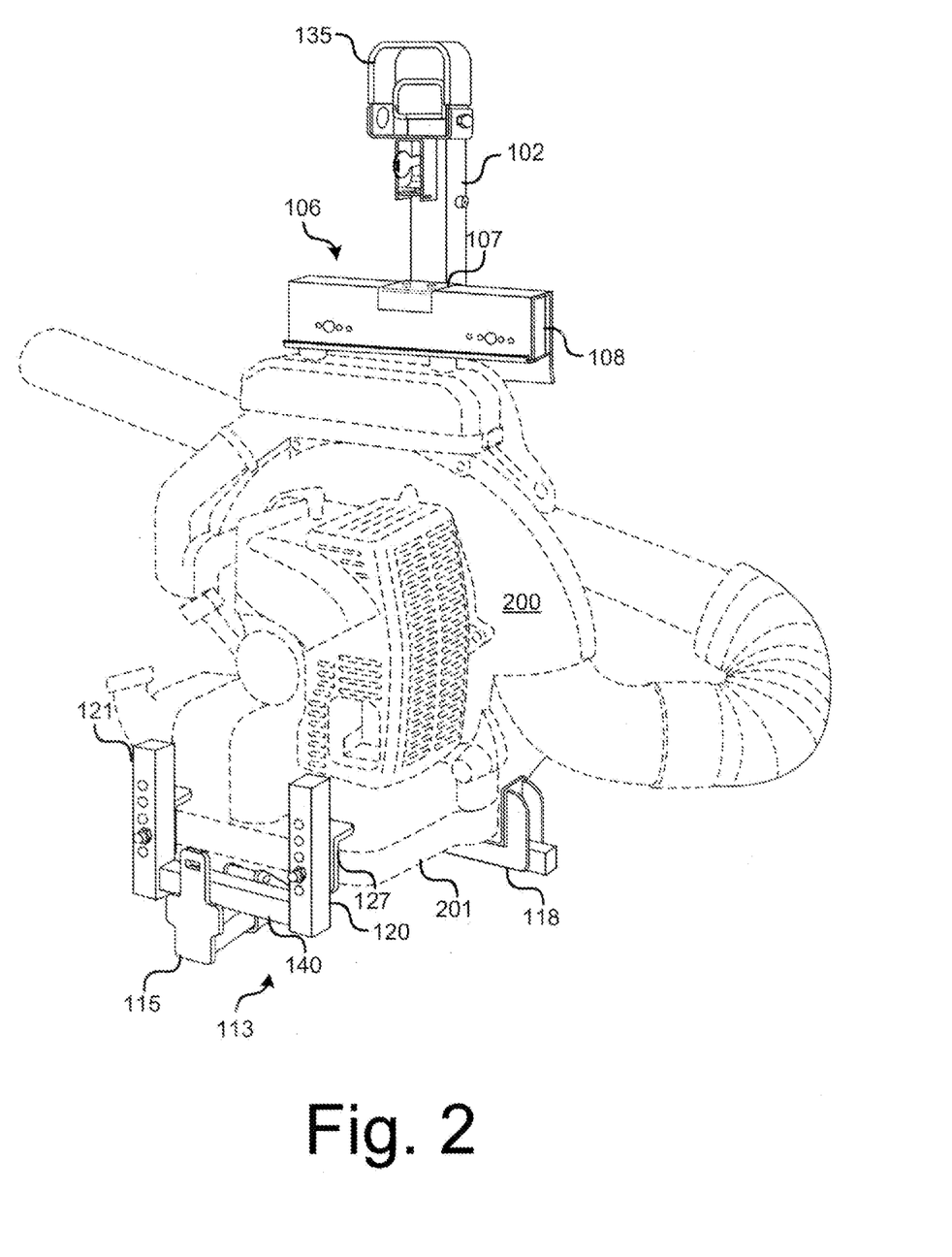
FIG. 2 illustrates the locking equipment rack of FIG. 1 holding a piece of equipment.

The present embodiments are directed toward locking equipment racks. Particular embodiments are directed towards locking equipment racks for backpack blowers. FIGS. 1-11 illustrate one such embodiment of a locking equipment rack. The equipment rack includes an outer support shaft 101, an inner support shaft 102 configured to slide within the outer support shaft 101, a restraining member 106 coupled to the inner support shaft 102, and a base 113 coupled to the outer support shaft 101. As illustrated in FIG. 2, the rack is configured to store a piece of equipment 200 restrained in the distal-proximal direction between the restraining member 106 and the base 113.

The restraining member 106 comprises a restraining bracket 107 coupled to the inner support shaft 102 and a bonnet or hood member 108 coupled to the restraining bracket 107. The hood member 108 is open at the distal end (towards the base) to allow the handle of a piece of equipment to be covered by the hood, restraining the piece of equipment in both the proximal and anterior direction (away from the support shafts 101 and 102. In some embodiments, the hood member 108 is adaptable to fit different widths of equipment handles. In the illustrated embodiment, the width adaptation is achieved through the use two sets of bolt holes 112 and 111. A bolt 109 or 110 is inserted into one of each set of bolt holes 112 and 111, allowing only certain handle sizes to fit within the open bottom of the hood member 108.

Figure 3:
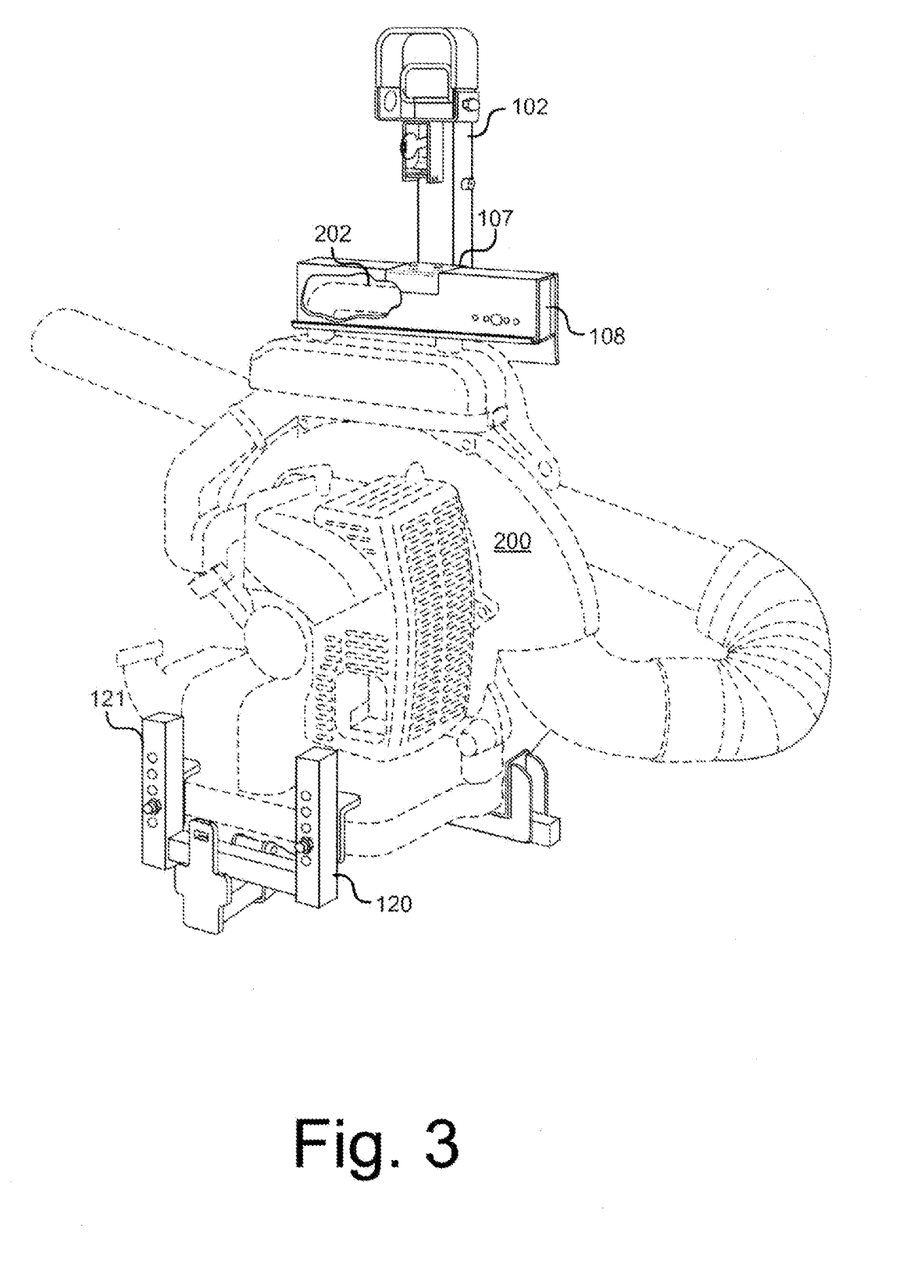
FIG. 3 illustrates the handle retention components of the locking equipment rack of FIG. 1.
Figure 4:
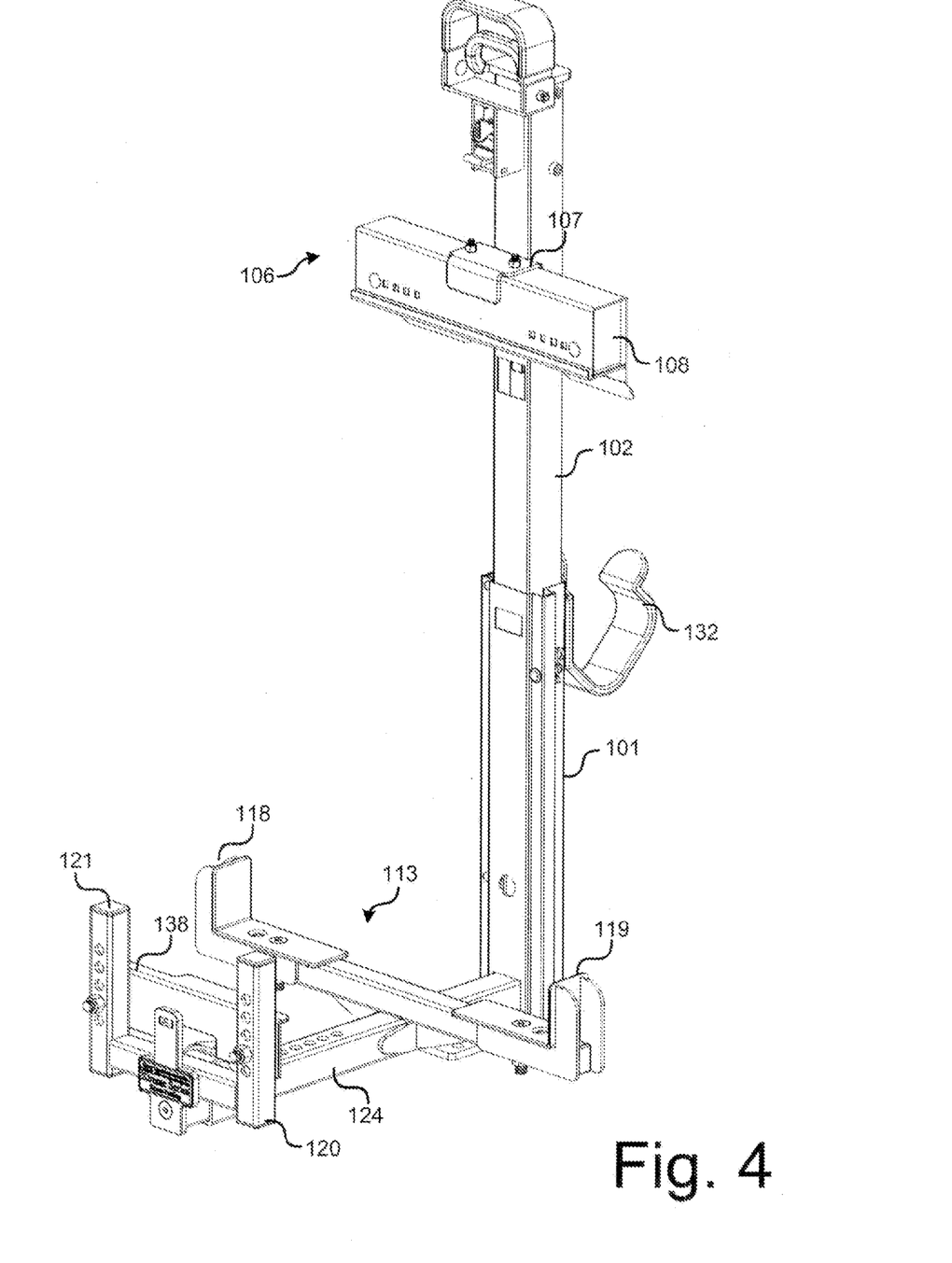
FIG. 4 illustrates a locking equipment rack with a single base retaining clip implemented in accordance with an embodiment.

FIG. 3 illustrates a handle 202 of a backpack blower 200 disposed within the hood member 108. As illustrated, the bottom of the hood member 108 is open, allowing the handle 202 to be restrained by the hood member 108 when the inner support member 102 is slid down to clamp the piece of equipment 200 in the rack.

In some embodiments, the hood member 108 is removable from the restraining bracket 107. In these embodiments, the restraining bracket 107 may be used to restrain a piece of equipment when the hood member 108 is removed. For instance, the restraining bracket 107 may be placed below the handle of a blower, to restrain the main body of the blower, or may be placed on a handle that would not otherwise fits within the hood member 108. The restraining bracket 107 has a projection 170 that both stabilizes the hood member 108 when attached and restrains the equipment when used without the hood member 108.

The base 113 is configured to restrain the bottom portion of the piece of equipment. In the illustrated embodiment, the base 113 comprises a pair of side brackets 118 and 119 and a pair of front brackets 121 and 120. The side brackets 118 and 119 restrain the blower in the lateral directions, while the front brackets 121 and 120 restrain the blower in the anterior direction.

In the illustrated embodiment, the side brackets 118 and 119 are L-shaped, with each having a first contact surface. 171 for the bottom of the blower and a second contact surface 172 to contact the side of the blower. The brackets 118 and 119 are coupled to the outer support shaft 101 via a cross bar 130 coupled to a support member 124, which is coupled to a distal portion of the outer support shaft 101. In some embodiments, the width of the base 113 is adjustable by varying the positions of the brackets 118 and 119 on the arm 130—for example, through a plurality of bolt holes 131 in the arm 130 that are set at different widths.

The front brackets 120 and 121 restrain the equipment in the anterior direction. The front brackets are mounted to an arm 140 at their distal ends. In the illustrated embodiment, the arm 140 is mounted on a second support member 125 which slides within the first support member 124. This sliding arrangement allows different sizes of blowers to be accommodated by the rack. In the illustrated embodiment, a clip 126 and 127 is mounted on each bracket 121 and 120, respectively. The clips 126 and 127 are L-shaped with an upper restraining surface to restrain an upper portion of the equipment, and an outer restraining surface to restrain an outer portion of the equipment. The clips are removable and height adjustable by varying their position using a net and bolt arrangement 128 and a set of spaced apart bolt holes 129. Through the use of two clips, asymmetrically shaped blowers may be accommodated by setting the clips 126 and 127 at different heights. Additionally or alternatively, a single clip 138 may span the first and second brackets 121 and 120, as in FIG. 4. This clip may be used to adapt the rack to different models of blower than may be accommodated by the two clip arrangement of FIG. 1. Additionally, the clips 126, 127, or 138 may be removed entirely and the brackets 121 and 120 can contact the blower directly.

Figure 5:
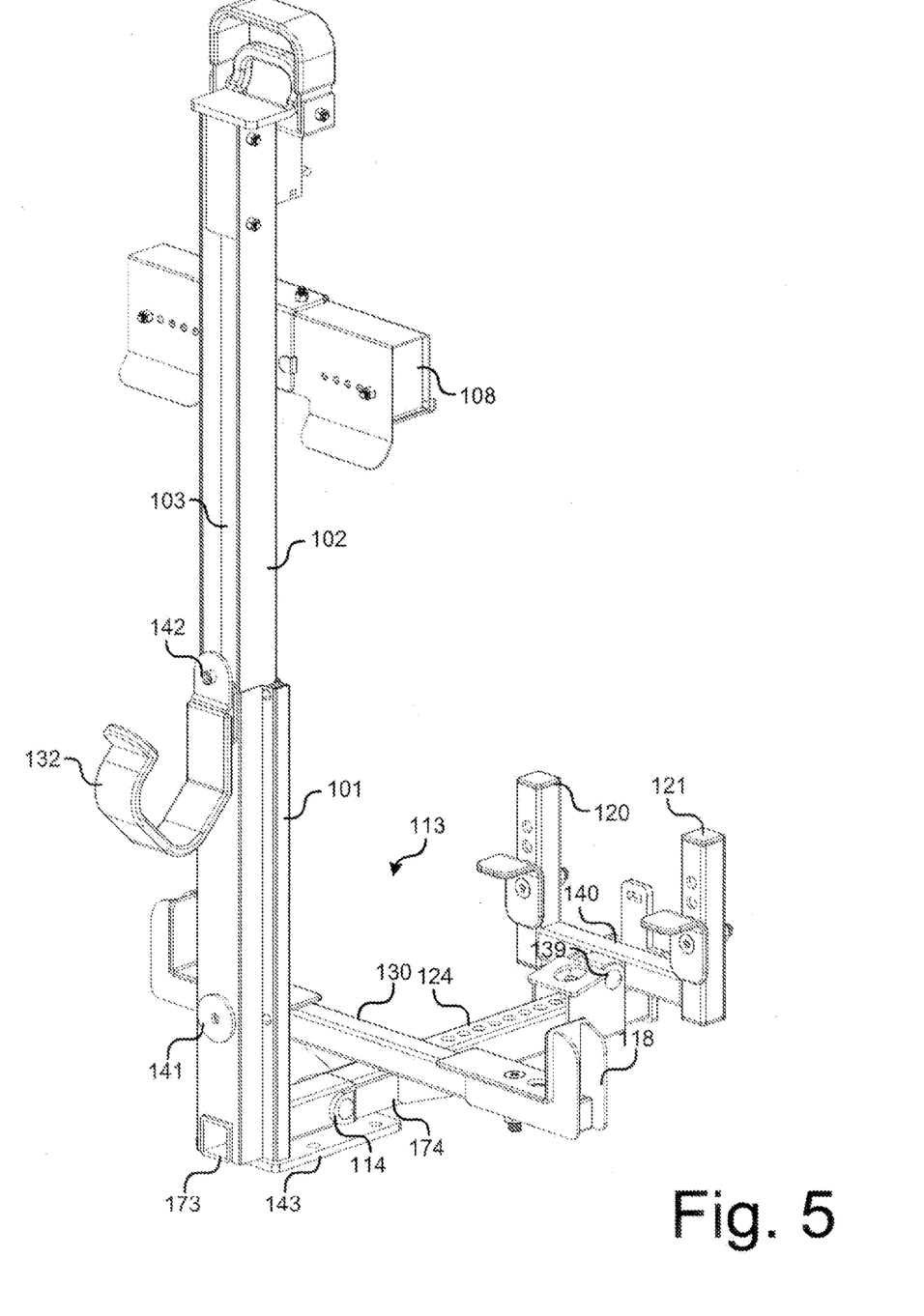
FIG. 5 is a rear view of the equipment rack of FIG. 1.

Some embodiments are configured to be mounted in various configurations in various equipment storage locations, such as trailers. FIG. 5 illustrates a rear view of an embodiment of an equipment rack. The illustrated equipment rack has mounting points for two different locations. First, a mounting plate 143 is coupled to the support member 124 near the distal end of the outer support arm 101. The mounting plate 143 allows the rack to be mounted to a floor (such as the bed of a trailer) in an upright configuration.

As a second mounting option, the rack comprises a plurality of mounting points 141 and 142 to allow the rack to be mounted to a wall (such as the wall of an enclosed trailer). The illustrated rack comprises a hose clip 132 for holding a blower hose of a blower stored in the rack. When the rack is mounted in the upright position using the mounting plate 143, the hose clip 132 is mounted through the upper wall mount point 142. When the rack is mounted to a wall using the mounting points 141 and 142, the hose clip may be mounted to the wall next to the rack.

Some embodiments may be folded into a stowed configuration when not storing a piece of equipment. The support member 124 includes a first hinge 114. The first hinge 114 separates the support member into a posterior arm 173 and an anterior arm 174. The crossbar 130 is mounted on the anterior arm 174 and the mounting plate 143 is mounted on the poster arm 173. The first hinge 114 bends to allow the base 113 to be folded towards the inner and outer support shafts 101 and 102. A second hinge 139 is coupled to the anterior arm 174 and is also coupled to the arm 140. The second hinge 139 allows the arm 140 and brackets 120 and 121 to be folded towards the support member 124.

Figure 6:
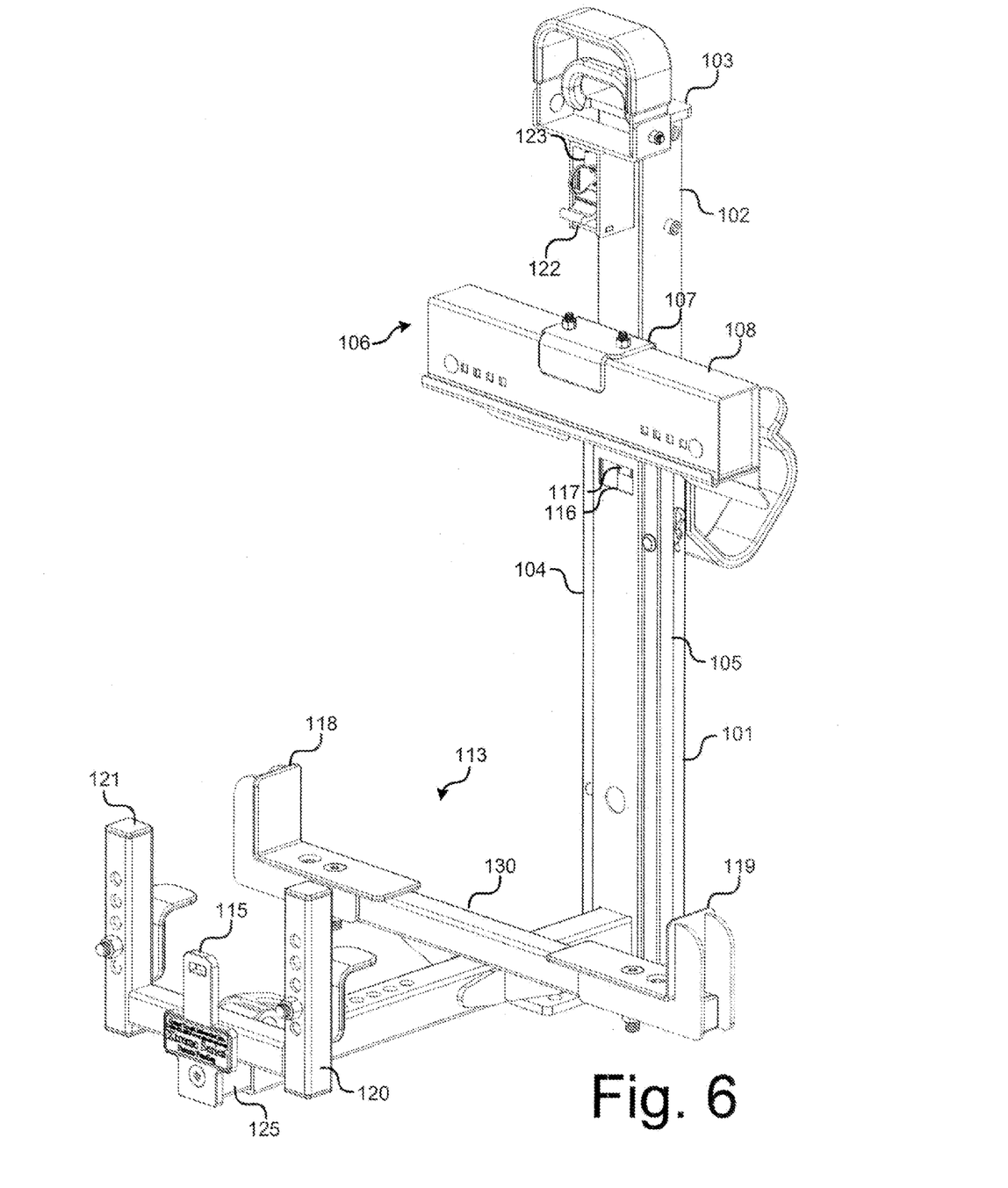
FIG. 6 is a front view of the locking equipment rack of FIG. 1 in an unextended position.

Referring back to FIG. 1, the rack further includes a first latch member 115 coupled to the second support member 125 and a second latch member 117 mounted to a locking shaft 144 (further functions of the locking shaft 144 are discussed below). The outer support shaft 101 has first window 116 and the inner support shaft 102 has a second window 137. FIG. 6 illustrates a front view of the rack when the inner support shaft 102 is in its fully unextended position within the outer support shaft 101. In this position, the first window 116 is aligned with the second window 137, allowing access to the second latch member 117 through the outer support shaft 101 and inner support shaft 102.

Figure 7:
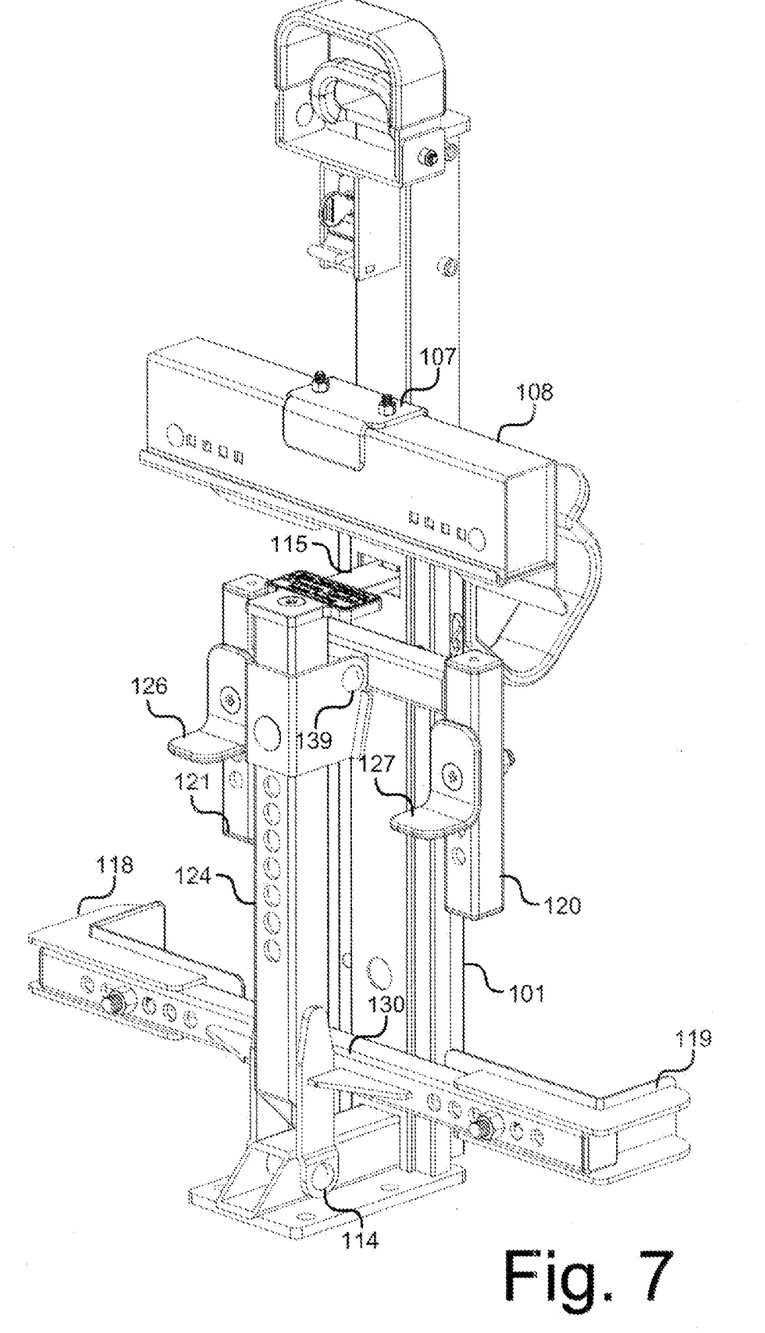
FIG. 7 is a front view of the locking equipment rack of FIG. 1 in a stowed position.
Figure 8:
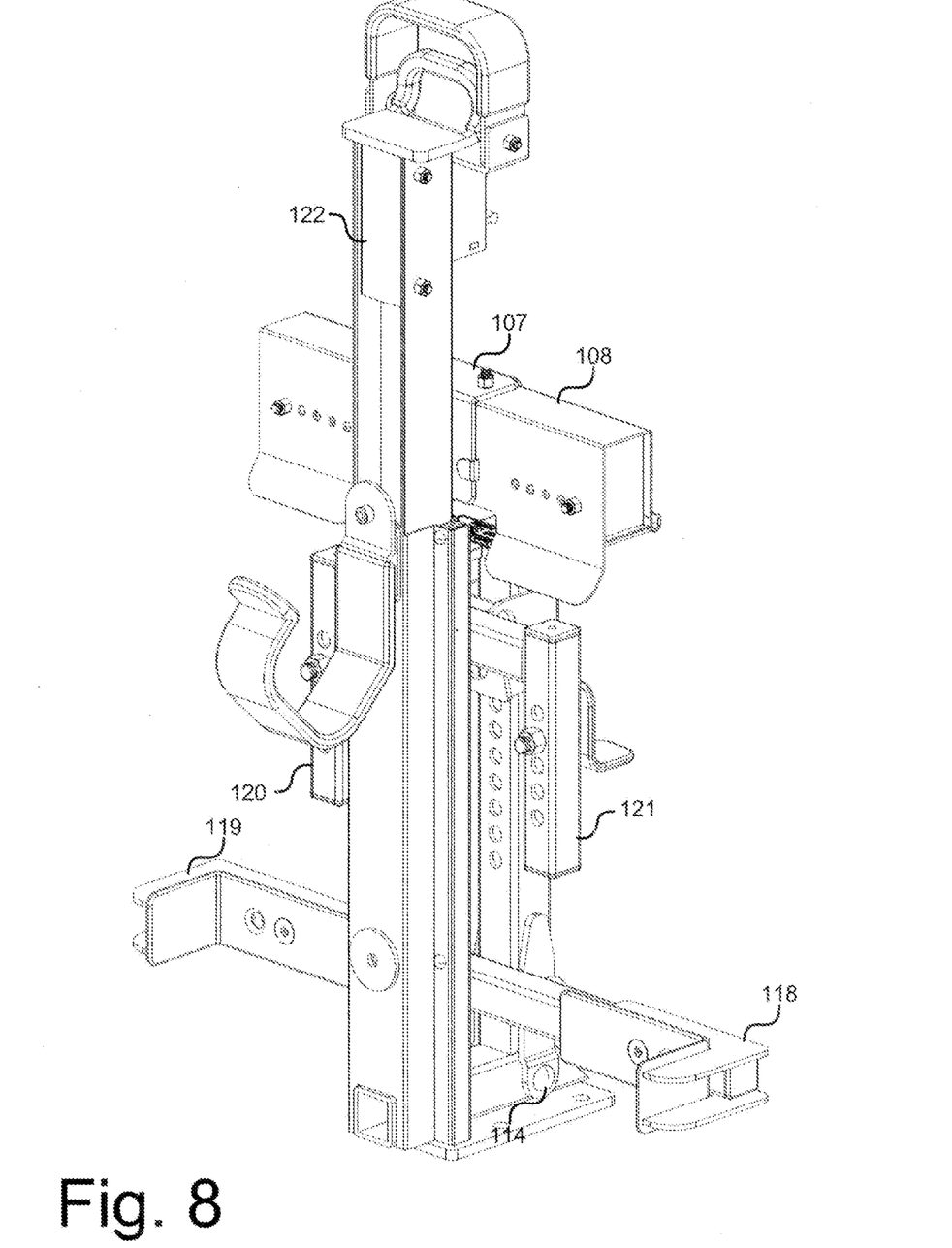
FIG. 8 is a rear view of the locking equipment rack of FIG. 1 in a stowed position.

FIG. 7 illustrates a front view of the rack in the stowed position and FIG. 8 illustrates a rear view of the rack in the stowed position. As illustrated, to place the rack in the stowed position, the second hinge 139 is bent to move the brackets 121 and 120 towards the support member 124. The first hinge 114 is then bent to move the support member 124 towards the outer support shaft and to latch the first latch member 115 with the second latch member 117, locking the rack in the stowed position.

To lock a blower in the rack, the blower 200 is placed into the base 113. The inner support shaft 102 is then lowered into the outer support shaft 101 to clamp the blower 200 between the base 113 and the restraining member 106. The inner support shaft 102 is configured to be lockable at a variety of positions within the outer support shaft 101 to restrain a variety of different types of blowers. In one embodiment, the locking mechanism operates in a ratcheting manner, such that the inner support shaft 102 is free to move further into the outer support shaft 101, but is prevented from extending away from the outer support shaft 101.

Figure 9:
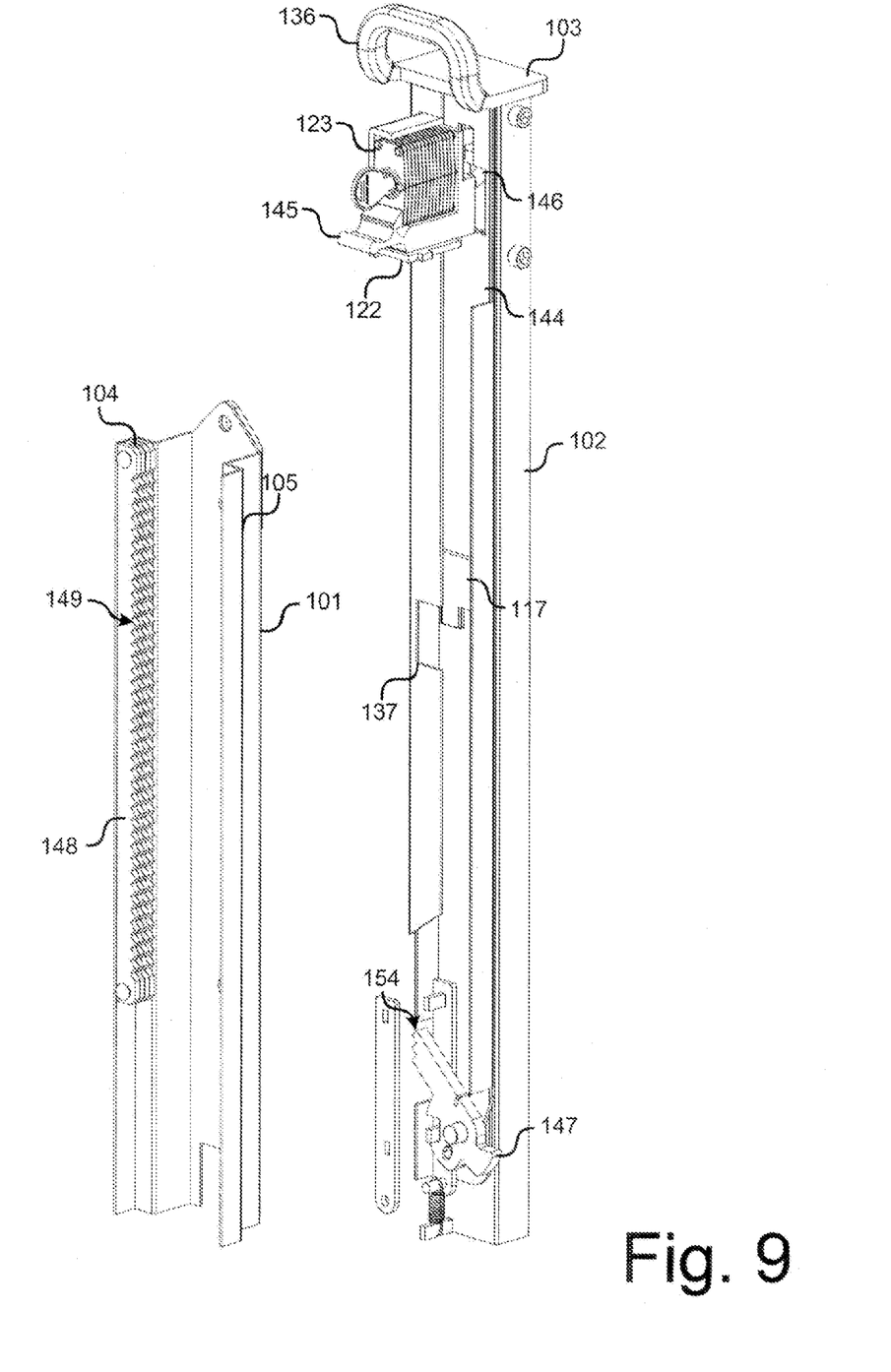
FIG. 9 is a sectional view of components of a locking arrangement for an equipment rack implemented in accordance with an embodiment.

FIG. 9 illustrates a locking mechanism implemented in accordance with an embodiment of the invention. This figure is a cutaway view of a portion of the inner support shaft 102 and outer support shaft 101. As illustrated, the inner support shaft 102 has a locking shaft 144 disposed within it. The locking shaft is coupled to a first securing member 147, which locks by interfacing with a second securing member 148 as discussed further below. The locking shaft 144 is further coupled to a cap 103 coupled to a handle 136. Referring to FIG. 1 as well, a bail 135 is coupled to the proximal end of the inner support shaft 102. When the handle 136 is pulled towards the bail 135, the locking shaft 102 slides proximally and disengages the first securing member 147 with the second securing member 148, allowing the inner support shaft 102 to slide freely within the outer support shaft 101.

Figure 10:
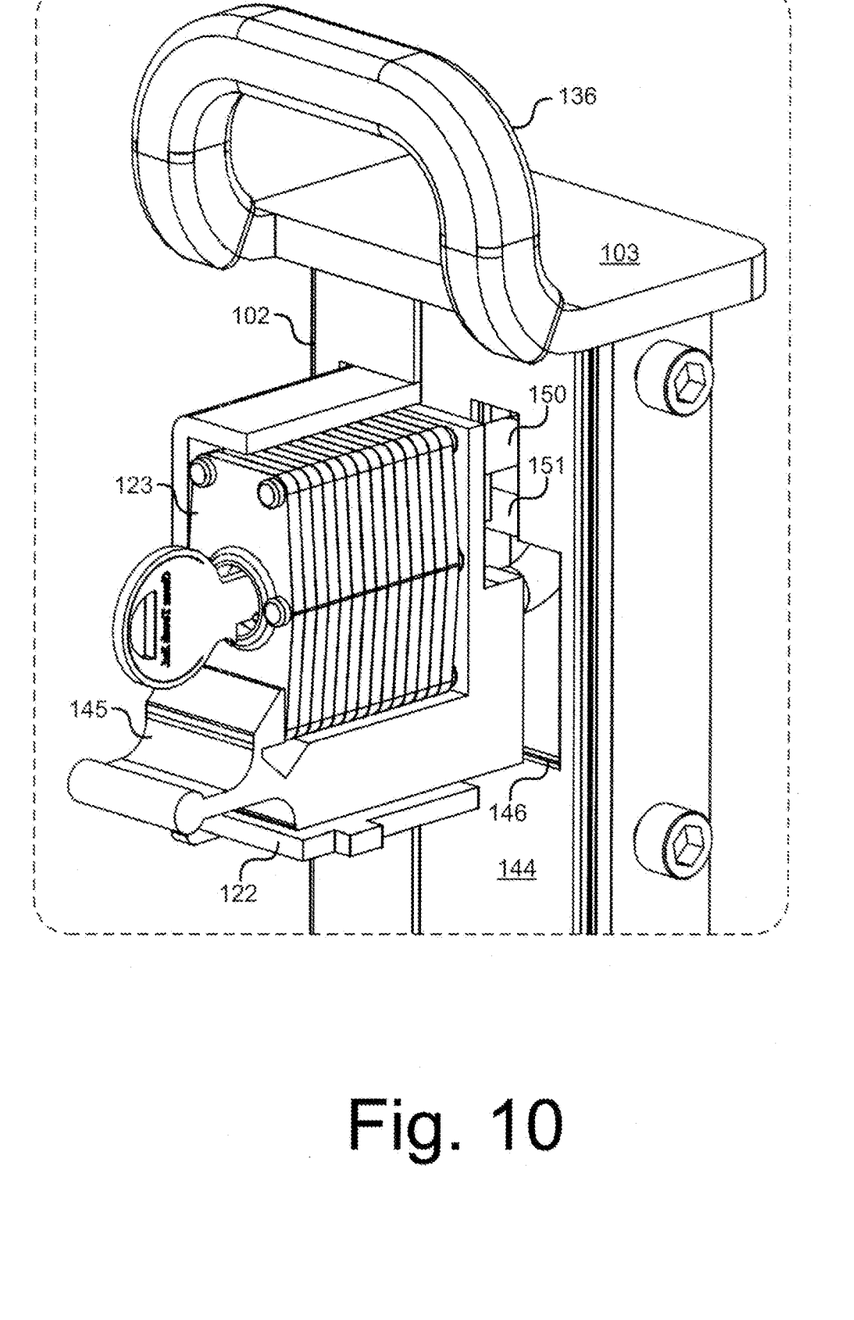
FIG. 10 is a detailed view of a locking system for the locking arrangement of FIG. 9.

The locking shaft 144 further comprises a lock window 146. A corresponding shielding lock housing 122 coupled to the inner support shaft 102 contains a lock 123. The shielding lock housing prevents tampering with lock 123. When locked, the lock 123 extends into the window 146, preventing the locking shaft 144 from sliding with respect to the inner support shaft 102. FIG. 10 illustrates this locking arrangement in greater detail. As illustrated, the lock body 123 sits within a lock sled 145 with a profile matching that of the window 146. The shackle 150 of the lock is threaded over a bar 151 coupled to the inner support shaft 102, preventing the lock 123 from being removed during ordinary usage. As discussed further below, the lock sled 145 and lock 123 may be completely removed from the rack, allowing the lock 123 to be replaced.

Figure 11:
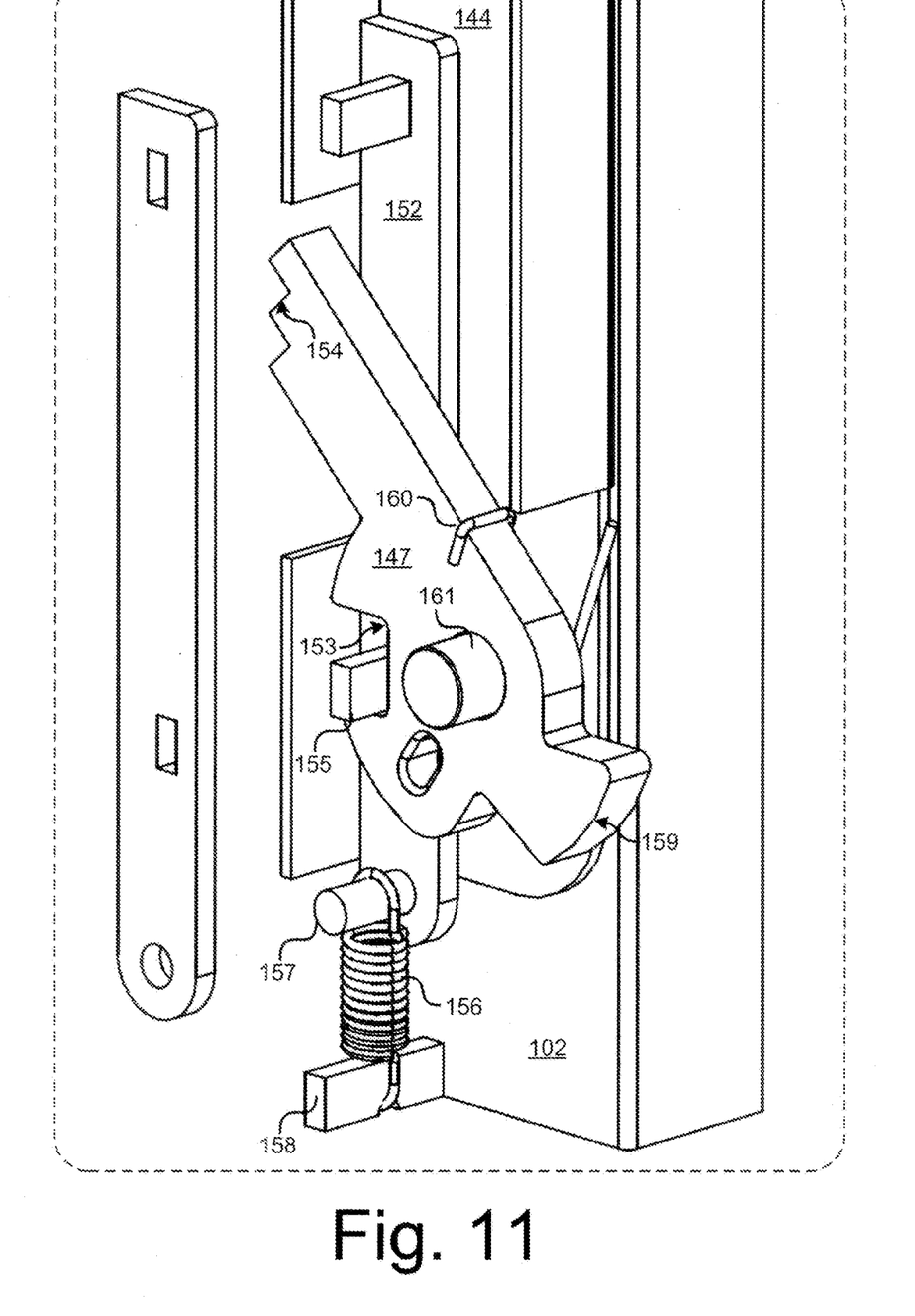
FIG. 11 is a detailed view of a securing system for the locking arrangement of FIG. 9.

FIG. 11 illustrates the first securing member 147 and related components in further detail. A pivot point 161 is mounted on the locking shaft 144. The securing member 147, or locking dog 147, is able to rotate on the pivot point, with its motion limited by projection 155, which is mounted within a housing 152 (illustrated as two pieces for sake of explanation; in implementation the housing is typically a single welded piece). When the projection 155 presses against the lower wall of the indentation 153, the dog 147 rotates to move the locking surface 154 away from the inner support shaft 102. This causes the locking surface 154 to interface with the teeth 149 (see FIG. 8) of the second securing member 148 and prevents the inner support shaft 102 from extending proximally. Conversely, when the projection 155 presses against the upper wall of the indentation 153, the dog 147 rotates to move the locking surface 154 towards the inner support shaft 102, disengaging the surface 154 from the teeth 149 and allowing the inner support shaft 102 to move freely.

Referring again to FIG. 9, the locking surface 154 is oriented to contact the teeth 149 on their distal surfaces when in the locked position. This prevents the inner support shaft 102 from extending further, but allows the inner support shaft 102 to slide into the outer support shaft 101 freely.

A spring 156 is attached to a first spring attachment member 157 coupled to the locking shaft 144 via the housing 15. The spring 156 is further attached to a second spring attachment member 158 coupled to the inner support shaft 102. The spring pulls down on the locking shaft 144, biasing the dog 147 in the locked position. A torsion spring 160 further biases the dog 147 in the locked position.

The dog further includes a projection 159. The projection 159 extends from the inner support shaft 102 and fits within keyway 105 in the outer support shaft 101 (illustrated in FIG. 1). When the inner support shaft 102 is pulled in a proximal direction, the projection 159 prevents the inner support shaft 102 from being completely removed from the outer support shaft 101. The outer support shaft has a removable bolt 133, held in place by a cotter pin 134, for example. When the projection 159 contacts the bolt 133, the dog 147 is rotated out of engagement with the second securing member 148, keeping the inner support shaft 102 in an extended position until the handle 136 is pulled again.

Figure 12:
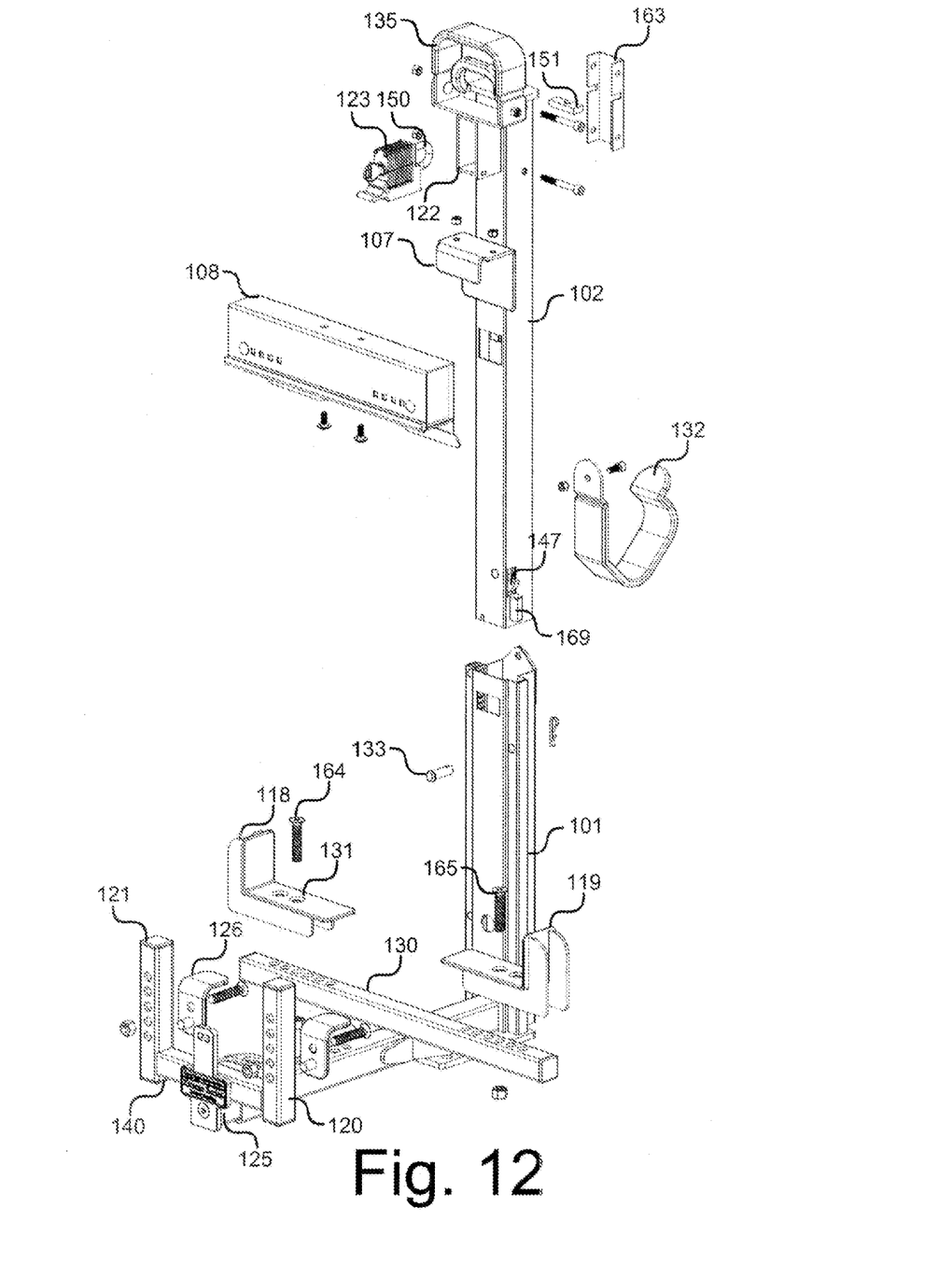
FIG. 12 illustrates the locking equipment rack of FIG. 1 in a disassembled state.

FIG. 12 illustrates a disassembled equipment rack, including the components that are typically removable and adjustable as described above. In the illustrated embodiment, the inner support shaft 102 can be removed from the outer support shaft 101 through the removal of pin 133. The support shaft includes a projection 169 at the proximal end that fits into the key way 105 to maintain alignment. The projection 169 also prevents the shaft 102 from being removed when the pin 133 is in place and the support shaft 102 is locked in the fully extended position.

Additionally, this view illustrates the removal of the lock 123 and lock sled 150. The rear panel 163 of the lock housing 122 can be removed, allowing removal of 151 when the lock 123 is unlocked. This allows the lock 123 to be replaced.

While various embodiments have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shaft not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing; the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. The presence of broadening words and phrases such as "one or more," "at least," "but not limited to" or other like phrases in some instances shaft not be read to mean that the narrower case is intended or required in instances where such broadening phrases may be absent.

The invention claimed is:
1. An equipment rack, comprising:
an outer support shaft;
an inner support shaft configured to slide within the outer support shaft;
a locking shaft slidably disposed within the inner support shaft, wherein the locking shaft comprises a lock receptacle;
a first securing member coupled to the locking shaft;
a second securing member disposed within the outer support shaft, the second securing member configured to fix the position of the inner support shaft with respect to the outer support shaft by mating with the first securing member when the locking shaft is slid within the inner support shaft;
a lock coupled to the inner support shaft and configured to prevent the locking shaft from sliding with respect to the inner support shaft when the lock is engaged in the lock receptacle;
a restraining member coupled to the inner support shaft and configured to restrain a first portion of a piece of equipment; and
a base coupled to the outer support shaft and configured to restrain a second portion of the piece of equipment;
wherein the restraining member comprises:
a restraining bracket coupled to the inner support shaft; and
a hood member releasably coupled to the restraining bracket and having a handle receptacle configured to receive a handle of the piece of equipment, wherein the handle receptacle is configured to have an adjustable width to fit the handle of the piece of equipment.
2. An equipment rack, comprising:
an outer support shaft;
an inner support shaft configured to slide within the outer support shaft;
a locking shaft slidably disposed within the inner support shaft to move from an unlocked position to a locked position;
a first securing member coupled to the locking shaft;
a second securing member disposed within the outer support shaft, the second securing member configured to fix the position of the inner support shaft with respect to the outer support shaft by mating with the first securing member when the locking shaft is in the locked position;
a restraining member coupled to the inner support shaft and configured to restrain a first portion of a piece of equipment; and
a base coupled to the outer support shaft and configured to restrain a second portion of the piece of equipment;
wherein:
the base comprises a hinge to allow the base to rotate towards the inner support shaft, and the base further comprises a first latch member;
the inner support shaft comprises a window for the first latch member; and
the locking shaft comprises a second latching member configured to engage with the first latch member to maintain the base in a stowed position.
3. An equipment rack, comprising:
an outer support shaft;
an inner support shaft configured to slide within the outer support shaft;
a locking shaft slidably disposed within the inner support shaft, wherein the locking shaft comprises a lock receptacle;
a first securing member coupled to the locking shaft;
a second securing member disposed within the outer support shaft, the second securing member configured to fix the position of the inner support shaft with respect to the outer support shaft by mating with the first securing member when the locking shaft is slid within the inner support shaft;
a lock coupled to the inner support shaft and configured to prevent the locking shaft from sliding with respect to the inner support shaft when the lock is engaged in the lock receptacle;
a restraining member coupled to the inner support shaft and configured to restrain a first portion of a piece of equipment; and
a base coupled to the outer support shaft and configured to restrain a second portion of the piece of equipment;
wherein the base comprises a pair of side brackets positioned to restrain the piece of equipment in a lateral direction and a plurality of front brackets positioned to restrain the piece of equipment in an anterior direction.
4. The equipment rack of claim 1, wherein the second securing member comprises a plurality of teeth and the first securing member comprises a ratcheting dog coupled to the locking shaft at a pivot such that the ratcheting dog engages the teeth when the locking shaft is in the locked position and disengages the teeth when the locking shaft is in the unlocked position.
5. An equipment rack, comprising:
an outer support shaft;
a base coupled to a distal end of the outer support shaft, the base comprising:
a support member coupled to the distal end of the outer support shaft and positioned to restrain a piece of equipment in the distal direction;
a pair of side brackets coupled to the support member and positioned to restrain a piece of equipment in lateral directions; and
a front bracket coupled to the support member and positioned to restrain the piece of equipment in an anterior direction;
an inner support shaft configured to slide within the outer support shaft;
a restraining member coupled to the inner support shaft and positioned to restrain the piece of equipment in a proximal direction; and
a locking shaft slidably disposed within the inner support shaft to move from an unlocked position to a locked position to fix and unfix the distance between the restraining member and the support member;
wherein the distance between the restraining member and the support member is variable by sliding the inner support shaft within the outer support shaft.
6. The equipment rack of claim 5, wherein the pair of side brackets are adjustably mounted on a crossbar coupled to the support member.
7. The equipment rack of claim 5, wherein the support member has an adjustable length to adjust the position of the front bracket.
8. The equipment rack of claim 7, further comprising a removable clip that can be coupled to the front bracket at a plurality of different heights.
9. The equipment rack of claim 8, wherein the clip comprises an upper restraining surface configured to restrain the frame in the proximal direction.

10. The equipment rack of claim 5, wherein:
the support member comprises a hinge to allow the base to rotate towards the inner support shaft, and the support member further comprises a first latch member;
the inner support shaft comprises a window for the first latch member; and
the locking shaft comprises a second latching member configured to engage with the first latch member to maintain the base in a stowed position.

11. The equipment rack of claim 5, further comprising a lock disposed within a lock shielding housing coupled to the inner support shaft, and the lock configured to engage a lock receptacle in the locking shaft to prevent movement of the locking shaft from the locked position to the unlocked position.

12. An equipment rack, comprising:
an outer support shaft;
a base coupled to a distal end of the outer support shaft, the base comprising:
    a support member coupled to the distal end of the outer support shaft and positioned to restrain a piece of equipment in the distal direction;
    a pair of side brackets coupled to the support member and positioned to restrain a piece of equipment in lateral directions; and
    a front bracket coupled to the support member and positioned to restrain the piece of equipment in an anterior direction;
an inner support shaft configured to slide within the outer support shaft; and
a restraining member coupled to the inner support shaft and positioned to restrain the piece of equipment in a proximal direction;
wherein the distance between the restraining member and the support member is variable by sliding the inner support shaft within the outer support shaft; and
wherein the restraining member comprises:
    a restraining bracket coupled to the inner support shaft; and
    a hood member releasably coupled to the restraining bracket and having a handle receptacle configured to receive a handle of the piece of equipment.

13. The equipment rack of claim 12, wherein the handle receptacle is configured to have an adjustable width to fit the handle of the piece of equipment.

14. An equipment rack, comprising:
an outer support shaft;
a plurality of teeth coupled to an inner surface of the outer support shaft;
an inner support shaft configured to slide within the outer support shaft;
a ratchet dog disposed within the inner support shaft and configured to engage and disengage with the plurality of teeth, wherein the inner support shaft is prevented from sliding out of the outer support shaft when the ratchet dog is engaged with the plurality of teeth;
a removable lock coupled to the inner support shaft and configured to prevent the ratchet dog from disengaging with the plurality of teeth when in a locked position;
a restraining member coupled to the inner support shaft and configured to restrain a first portion of a piece of equipment; and
a base coupled to the outer support shaft and configured to restrain a second portion of the piece of equipment.

15. The equipment rack of claim 14, further comprising a locking shaft disposed within the inner support shaft and coupled to the ratchet dog, wherein the locking shaft causes the ratchet dog to pivot to disengage and engage the plurality of teeth when slid within the inner support shaft.

16. The equipment rack of claim 15, wherein the locking shaft comprises a lock receptacle and wherein the lock engages the lock receptacle when in the locked position.

17. The equipment rack of claim 14, further comprising a lock shielding housing coupled to the inner support shaft and housing the lock.

18. The equipment rack of claim 14, wherein the restraining member comprises:
a restraining bracket coupled to the inner support shaft; and
a hood member releasably coupled to the restraining bracket and having a handle receptacle configured to receive a handle of the piece of equipment.

19. The equipment rack of claim 18, wherein the handle receptacle is configured to have an adjustable width to fit the handle of the piece of equipment.

20. The equipment rack of claim 14, wherein:
the base comprises a hinge to allow the base to rotate towards the inner support shaft, and the base further comprises a first latch member;
the inner support shaft comprises a window for the first latch member; and
the locking shaft comprises a second latching member configured to engage with the first latch member to maintain the base in a stowed position.

* * * * *